United States Patent [19]

Krupp

[11] 4,090,539
[45] May 23, 1978

[54] ANTI-POLLUTION SERVICE STATION ASSEMBLY

[75] Inventor: Carroll Peter Krupp, Akron, Ohio

[73] Assignee: The B. F. Goodrich Company, Akron, OhioIO

[21] Appl. No.: 740,563

[22] Filed: Nov. 10, 1976

[51] Int. Cl.² .................. B65B 57/14; F16L 39/04
[52] U.S. Cl. .................. 141/198; 141/290; 141/392; 285/134
[58] Field of Search .................. 138/111–117; 141/59, 93, 94–96, 285, 290, 291, 295, 311, 382–386, 392, 192, 198; 285/134, 133 R

[56] References Cited

U.S. PATENT DOCUMENTS

| 236,519 | 1/1881 | Walsh | 285/134 |
| 3,899,009 | 8/1975 | Taylor | 141/59 |
| 3,980,112 | 9/1976 | Basham | 141/392 |
| 3,986,732 | 10/1976 | Stanley | 285/134 |

Primary Examiner—Richard E. Aegerter
Assistant Examiner—Frederick R. Schmidt
Attorney, Agent, or Firm—Joseph Januszkiewicz

[57] ABSTRACT

A fuel hose assembly having an inner and outer hose that have their respective ends secured to a coupling member that retains their ends in spaced apart positions thereby defining separate passageway while permitting the hoses to rotate relative to each other. The coupling member has means for rotating the fuel hose assembly relative to their connection to a fuel dispensing pump and vapor recovery system such that the one hose will convey the liquid fuel while the other hose will convey the fuel vapors that are displaced from the tank being filled with the liquid fuel. Sensing means are provided to prevent the flow of the liquid fuel via the vapor recovery passageways.

12 Claims, 6 Drawing Figures

U. S. Patent    May 23, 1978    Sheet 3 of 3    4,090,539

ANTI-POLLUTION SERVICE STATION ASSEMBLY

BACKGROUND OF THE INVENTION

The present invention relates to a liquid dispensing and fuel vapor recovery system and more particularly to a hose and adapter assembly which will dispense liquid volatile fuel while recovering the fuel vapors without admixing the two particularly in the recovery system.

It is conventional practice to store volatile hydrocarbon fuel such as gasoline at a service station in underground reservoirs from which the gasoline is pumped into the fuel tank of a customer's vehicle. As these fuel tanks are filled with gasoline, the vaporized fuel in the vehicle tank is displaced therefrom and escapes into the surrounding atmosphere. In certain areas of the United States, anti-pollution legislation has required the recovery and return of the volatile vapors of the gasoline during such filling operations. Newly designed pollution recovery apparatus for use in service station pumps including newly designed nozzles have failed to effectively and efficiently dispense fuel while recovering vapors. Such newly designed vapor recovery apparatus have recommended custom made fuel nozzles, which required a considerable capital investment while rendering others obsolete. The present invention provides an adapter means which can be used with all types of modified pollution control nozzles and accessories minimizing parts replacement while additionally providing a means for increasing their reliability in the recovery of vapor and eliminating the admixing of the fuel with the vapor in the vapor recovery system.

SUMMARY OF THE INVENTION

According to the present invention, a fuel hose assembly has a pair of concentric flexible hoses that are secured to tubular coupling members which are separately rotatable and spaced apart by a spider. The tubular coupling members are held in longitudinally aligned positions and connected to a swivel nut that permits the connection of the hose assembly to an adapter fitting that allows dispensing of liquid fuel via the inner hose and recovery of hydrocarbon fuel vapors via the outer hose. Sensing means are provided to prevent the liquid fuel from being conveyed via the fuel vapor recovery lines or passages.

DESCRIPTION OF THE PREFERRED EMBODIMENTS

Figure 1:
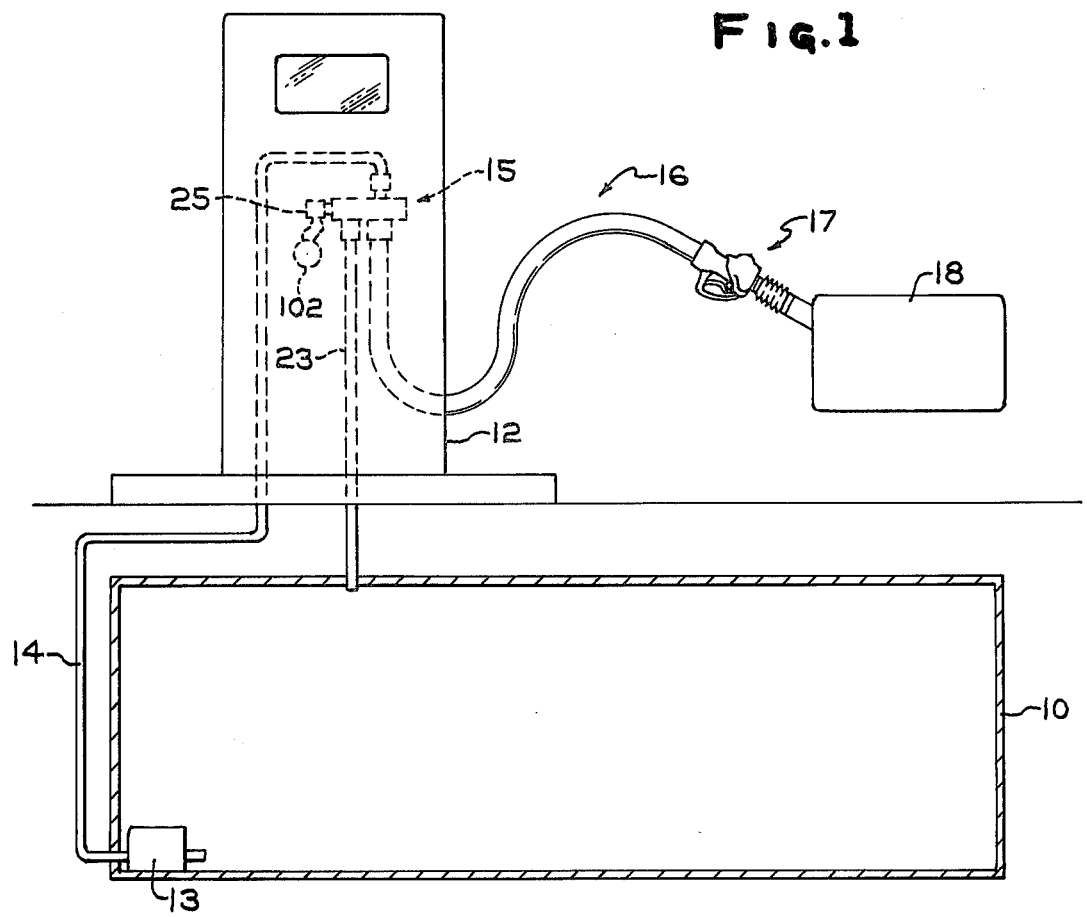
FIG. 1 is a diagrammatic view of a service station installation having a gasoline storage tank, pedestal, hose dispensing assembly with nozzle, vapor recovery system, and vehicle receptacle.

Referring to the drawings wherein like reference characters designate like or corresponding parts throughout the several views, there is shown in FIG. 1 an underground tank or storage means 10 for storing liquid fuel such as gasoline for delivery to pedestals 12 (only one shown) above ground in reasonable proximity to the tank 10.

Suitable pump means 13 is disposed in the tank 10 and is operative to pump gasoline through a conduit 14 and its associated accessories to the pedestal 12 for delivery to an adapter fitting 15 mounted thereon.

A delivery hose assembly 16 has one end connected to the adapter fitting 15 and the other end connected to a dispensing unit or gasoline pump fuel nozzle 17. The pedestal 12, pump means 13, and fuel pump nozzle 17 are described in detail in U.S. Pat. Nos. 3,907,010, 3,651,837 and 3,952,781 the disclosure of which is hereby incorporated by reference. Therefore, for the convenience of presentation the structural details of these units are not shown in detail and will only be described generally. The pump means 13 is of an electrically operated centrifugal type submersible pump which upon actuation pumps the gasoline up conduit 14, through adapter 15 in a manner to be described, through hose assembly 16 for dispensing through fuel pump nozzle 17 into receptacle 18. In lieu of pump means 13, other pump means may be used, such as a suction type pump located in pedestal 12.

The adapter fitting 15 has a body portion 20 with laterally spaced threaded opening 21 and 22. Opening 21 is adapted to be connected to the hose assembly 16 to the described, while threaded opening 22 is connected to a vapor recovery conduit 23 that extends downwardly in pedestal 12 into the tank 10, terminating in the upper portion thereof. Located closely adjacent to vapor recovery opening 22 is threaded sensor opening 24 with a liquid sensor 25 positioned therein. Sensor 25 has a probe 26 extending through opening 24 into the chamber 28 that interconnects opening 21 and opening 22. Located coaxially in alignment with opening 21 is a cylindrical tubular hub 29 whose external and internal surfaces are smooth. The external diameter of cylindrical hub 29 is substantially less than the internal diameter of threaded opening 21. Located diametrically opposite threaded opening 21 is an outwardly extending cylindrical hub 30. The outer external end portion of hub 30 has a circumferentially extending groove that receives a snag ring 31. A threaded coupling 32 is closely received by the hub 30 and retained thereon by the snap ring 31. The external surface of hub 30 is grooved closely adjacent to body portion 20 to receive an o-ring 9 to sealingly engage the threaded coupling 32. The threaded coupling 32 is connected to gasoline conduit 14 that supplies gasoline from the storage means or underground tank 10.

Figure 6:
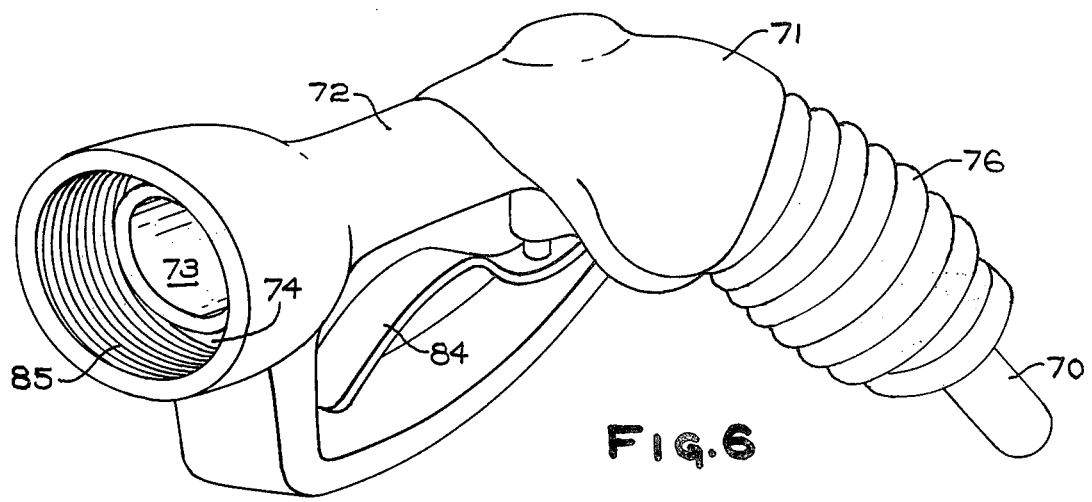
FIG. 6 is an isometric view of a modified form of a fuel dispensing nozzle.

The fuel delivery hose assembly 16 has an outer flexible conduit 40 and an inner flexible conduit 41 which conduits or hoses form a pair of concentric passages. The inner flexible conduit defines a passage or passageway 42 and cooperates with the outer flexible conduit 40 to define an annular passageway or passage 43 since the outer conduit 40 has an inside diameter that is greater than the outside diameter of inner flexible conduit 41. A coupling designated 45 connects the hose assembly to the adapter fitting 15. Coupling 45 includes an outer tubular member 46, an inner tubular member, a spider 61 and a swivel nut 62. Outer tubular member 46 has a tubular member 11 suitably press fitted to the one end portion thereof to provide a groove 47, which groove 47 receives the one end portion of outer flexible conduit 40. The inner periphery of groove 47, which includes the inner periphery of outer tubular member 46 and the outer end portion of tubular member 11, is serrated to insure a secure connection to conduit 40. The other end portion of outer member 46 has one circumferentially extending groove around the outer periphery for receiving a snap ring 48 and a pair of circumferentially extending grooves on the inner diameter thereof to receive a pair of snap rings 50 and 51. The inner tubular member of coupling 45 has a stepped outer configuration defining a large end portion 55, a small end portion 56, an intermediate portion 57 located therebetween, which intermediate portion 57 is larger in diameter than the end portion 56 but smaller in diameter than the large end portion 55. The inner periphery of the large end portion 55 of the inner tubular member is recessed to receive a tubular member 19 that is suitably press fitted therein. Such tubular member 19 cooperates with inner periphery of large end portion 55 to define a groove 53 to receive the one end of the inner flexible conduit or hose 41. Such groove 53 which includes the inner periphery of the large end portion 55 and the outer periphery of the one end portion of tubular member 19 may be serrated to insure the connection to inner flexible conduit or hose 41. The outer end surface of the small end portion 56 is grooved to receive a pair of o-rings 58-59 and a groove adjacent to the intermediate portion 57 to receive a snap ring 60 that retains a spider 61 on the intermediate portion of the one piece inner tubular member. Spider 61 has a passage 52 to communicate the annular passageway 43 with the chamber 28 and the vapor recovery conduit 23. The snap rings 50 and 51 retain outer tubular member 46 relative to the inner tubular member and permits the relative rotation of the inner flexible conduit 41 relative to the outer flexible conduit 40 and vice versa. Slidably mounted on the outer periphery of outer tubular member 46 is a swivel nut 62, which has a pair of spaced low friction bearings 63 and 64 mounted on the respective inner peripheral ends thereof. In addition, the intermediate inner periphery of the swivel nut 62 is grooved to receive an o-ring 49 to sealingly engage the outer periphery of the outer tubular member 46. Snap ring 48 retains the swivel nut 62 on the coupling 45 but permits the relative rotation of the swivel nut 62 relative thereto so that the coupling 45 may be connected to the adapter fitting 15 yet permitting the hoses or conduits 40 and 41 to be rotated relative thereto without kinking of any of the conduits. A similar coupling 45 is connected to the other end of the pair of conduits or hoses 40 and 41 so as to facilitate their connection to the fuel pump nozzle 17 as depicted by FIG. 6 and FIG. 1.

Figure 2:
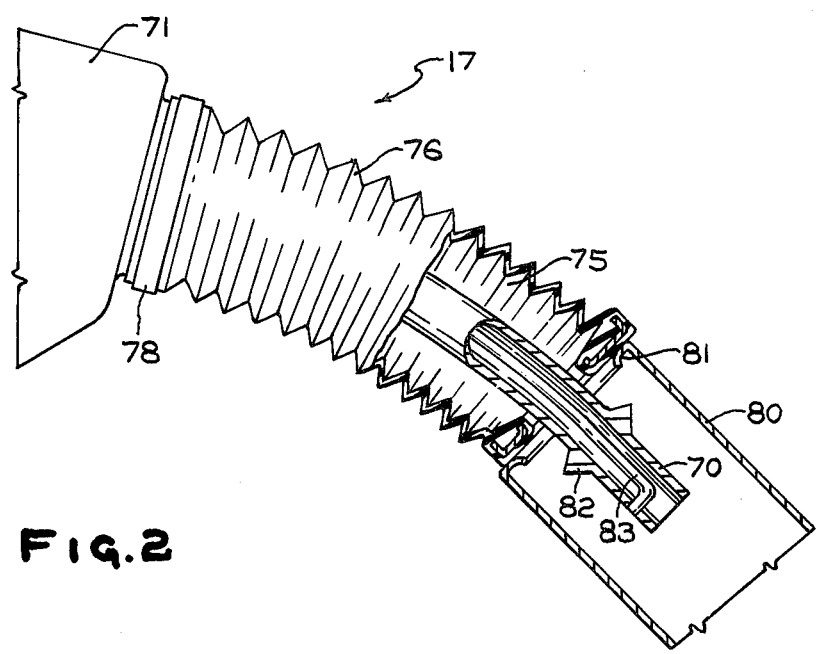
FIG. 2 partly in section is a side elevational view of the end portion of a gasoline dispensing nozzle and intake pipe of a vehicle receptacle.
Figure 3:
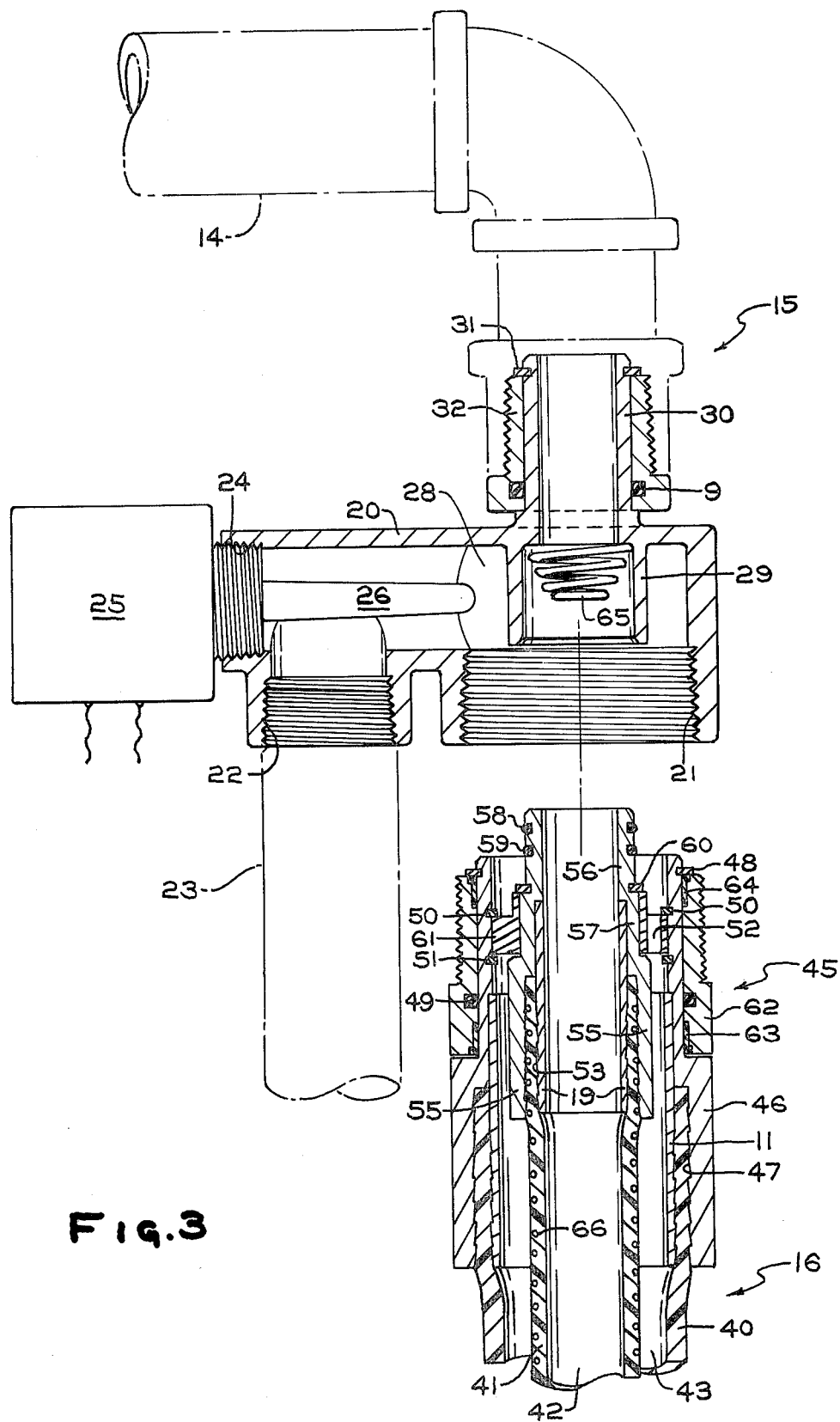
FIG. 3 is a fragmentary side elevational view of one end of a hose assembly with an adapter to which it is connected.

The fuel dispensing or pump nozzle is indicated generally as reference 17 and includes a discharge nozzle 70 connected to a valve housing 71. Valve housing 71 includes a tubular portion 72 which contains an inner tubular member shown generally as 73 which communicates with the discharge nozzle 70, and outer annular passageway 74 that communicates with the passageway 75 formed by a resilient flexible boot or shroud 76 with the discharge nozzle 70 (as best seen in FIG. 6). The flexible boot 76 is attached at its rear portion to the nozzle 17 by suitable clamp means 78 while allowing its other end to be free. As shown more clearly in FIG. 2, the fuel dispensing or pump nozzle 17 has its nozzle positioned into an inlet pipe 80 of an automobile gasoline tank to be filled while the free extremity of boot 76 abuttingly engages the rim 81 of the inlet pipe 80. The nozzle is positioned off center in the inlet pipe 80 such that a projection 82 on the nozzle 70 engages the underside of rim 81 of inlet pipe 80 to retain such dispensing nozzle 17 in position for fueling the tank 18. Tube 83 extending within discharge nozzle 70 is operative to shut off the flow of gasoline from the discharge nozzle 70 as is old and well known in the art. Note U.S. Pat. No. 3,651,837. Operating lever 84 is suitably held in its operating position by latch means or recesses and is moved into inoperative position by actuation of the flow of gasoline through tube 83. The end portion of the gasoline hoses or conduits are connected to the fuel dispensing pump nozzle 17 by threading swivel nut 62 (FIG. 3) into threaded opening 85 of the pump nozzle 17 while the o-rings 58 and 59 of the inner tubular member of the coupling 45 slidably engage the inner wall periphery of inner tubular member 73.

To connect the coupling 45 to the adapter fitting 15, a conical compression spring 65 is positioned within the hub 29 such that the end portion of the inner tubular member of coupling 45 compresses spring 65 to insure the grounding of the inner tubular conduit or hose 41, which hose 41 has a suitable spiral wound wire 66 along its entire length.

Figure 4:
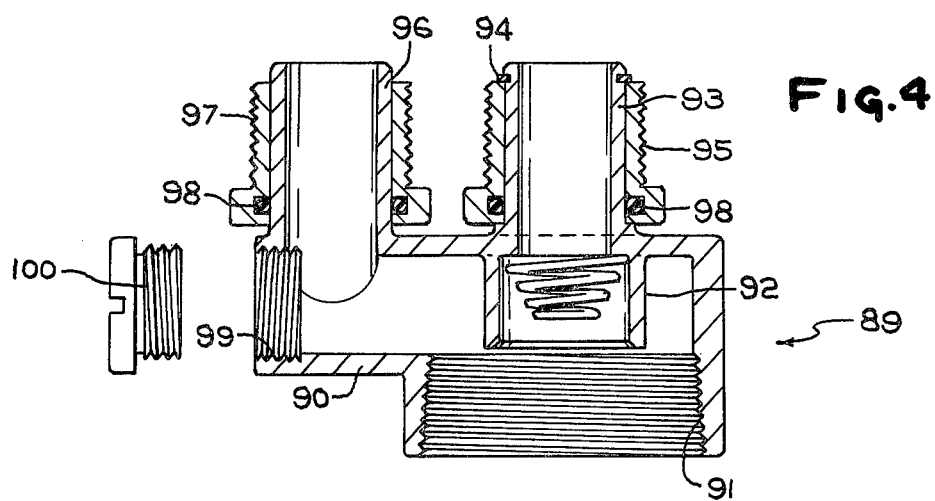
FIG. 4 is a side elevational view in cross section of an adapter fitting.
Figure 5:
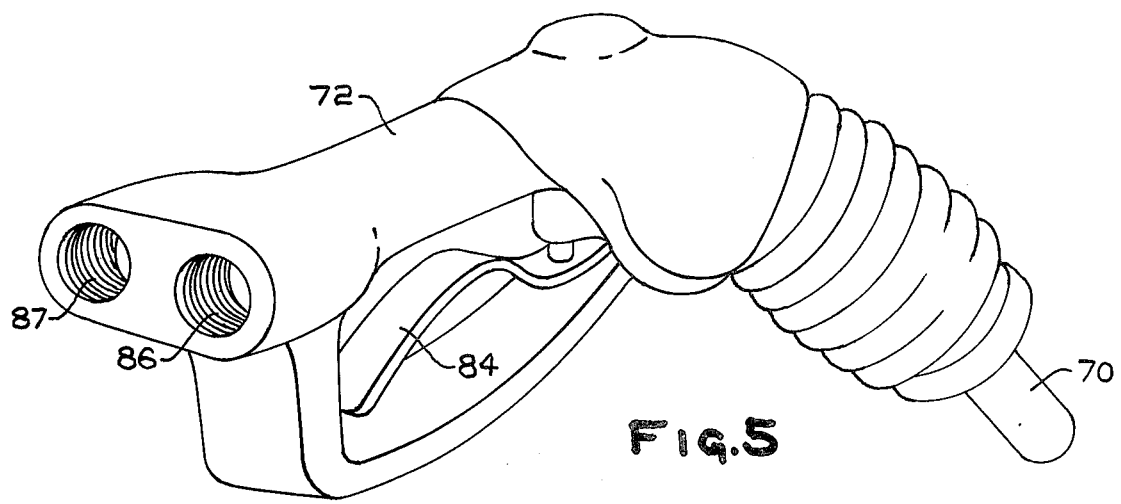
FIG. 5 is an isometric view of a fuel dispensing nozzle.

A fuel dispensing pump nozzle is shown in FIG. 5 that is substantially identical to that described above except that nozzle 70 is connected to a separate threaded opening 86 on the other end of the pump nozzle while the annular vapor recovery space between the boot 76 and the nozzle 70 communicates via a separate passageway to threaded outlet opening 87. This type of constructed fuel pump nozzle utilized separate parallel hoses from the pumping tank and the vapor recovery system. There are many of these pump nozzles in use and the present invention is adaptable to these pump nozzles through the use of adapter 89 shown generally in FIG. 4. Adapter 89 has a body portion 90 with a large threaded opening 91 for use in connection with the coupling 45 of hose assembly 16. Located coaxially within opening 91 is a cylindrical tubular hub 92 whose internal and external surfaces are smooth. The external diameter of cylindrical hub 92 is substantially less than the internal diameter of threaded opening 91. Communicating directly with cylindrical tubular hub 92 is an outwardly extending cylindrical hub 93 that is grooved around the outer peripheral end portion to receive a snap ring 94 that retains a threaded swivel nut 95 thereon. Extending outwardly from body portion 90 substantially parallel to cylindrical hub 93 is a cylindrical tubular hub 96 slidably receiving a threaded swivel nut 97, which nut 97 has journaled on its inner periphery on o-ring 98 that frictionally engages the outer wall surface of tubular 96. Extending into body portion 90 adjacent to tubular hub 96 is a threaded opening 99 which threadedly receives a screw cap 100.

A liquid sensor 25 is shown as suitably threaded into threaded opening 24. Such liquid sensor 25 through its probe 26 which projects into the passageway 28 where the vapors are conducted will detect or sense any liquid such as gasoline to provide an output signal that is operative to de-energize the pump B while simultaneously energizing an auditory signal such as bell 102 (depicted in FIG. 1).

In the operation of the described apparatus, the operator inserts the nozzle 70 of the pump fuel nozzle 17 into the inlet pipe 80 of the receptacle 18 such that the top of the projection 82 comes into abutting contact with the inner bottom circumferential portion of rim 81. This action compresses the boot 76 such that its free end portion abuttingly contacts the rim 81 and sealingly engages it. Energization of pump 13 pumps liquid fuel via conduit 14 and the inner tubular hose 41 of hose assembly 16 to nozzle 70 into the inlet pipe 80 of tank 18. The vaporized hydrocarbon fuel in the tank 18 is displaced from the tank and forced up out of the inlet pipe 80 into the annular passageway defined by the boot 76 and the nozzle 70 into the outer passageway 43 of hose assembly 16 defined by the outer conduit 40 and the inner conduit 41, for passage through the passageway 52 of spider 61 into chamber 28 of adapter fitting 15 for passage into vapor return conduit 23. Any overflow of gasoline or liquid fuel into the vapor recovery line or passageways is sensed by sensor probe 26 which is located in adapter fitting 15 at the pump end as described above to de-energize the pump 13 when liquid is detected and prevents the return of the fuel to the tank via the vapor recovery system. With the respective ends of the inner and outer hoses 41 and 42 journaled in their coupling 45, hoses 41 and 42 are able to rotate relative to each other and prevent crimping of the fuel dispensing hose 16. In addition, swivel nut 62 permits the rotation of the hose assembly line 16 relative to its connection to adapter 15 to ensure the ease of manipulation of the fuel pump nozzle 17 and its boot relative to the inlet pipe 80 of the vehicle receiving tank or receptacle 18 to assure a good seal on such inlet pipe 80.

Various modifications are contemplated and may obviously be resorted to by those skilled in the art without departing from the described invention, as hereafter defined by the appended claims, as only a preferred embodiment thereof has been disclosed.

I claim:

1. A fuel hose assembly having a pair of concentric fluid passages therein for conveying a volatile liquid in one direction to a receptacle and returning vapors of said volatile liquid from said receptacle; said hose assembly having a flexible inner hose defining an inner one of said fluid passages; a flexible outer hose having an inside diameter greater than the outside diameter of said inner hose defining an outer one of said fluid passages between said concentric hoses; an outer tubular fitting having end portions, said outer tubular fitting having one end portion secured to said outer hose; said outer tubular fitting having said other end portion with a smaller outside diameter than the outside diameter of said one end portion to provide a shoulder therebetween; the inner peripheral surface of the other end portion of said outer tubular fitting having a pair of spaced circumferentially extending grooves; a spider mounted within said outer tubular fitting between said spaced grooves; snap rings within said grooves to retain said spider in position on said outer tubular fitting to prevent axial movement but permit rotary movement of said spider thereon; said spider having an inner peripheral surface whose diameter is less than the inner diameter of said outer tubular fitting; an inner tubular fitting having a stepped outer configuration defining a large end portion, a small end portion, and an intermediate portion; said intermediate portion of said inner tubular fitting frictionally engaged by said inner peripheral surface of said spider; the juncture of said intermediate portion with said large end portion of said inner tubular fitting defining a shoulder that abuttingly engages said spider; the outer periphery of said small end portion of said inner tubular fitting having a groove; a snap ring located in said last mentioned groove securing said inner tubular fitting to said spider in axially aligned position; said large end portion of said inner tubular fitting secured to said inner hose; said small end portion of said inner tubular fitting having a pair of spaced grooves adjacent to the end thereof, o-rings mounted in said last mentioned spaced grooves; a rotary coupling member having its inner surface frictionally engaged by said other end portion of said outer tubular fitting; said rotary coupling member abuttingly engaged by said shoulder between said one end portion and said other end portion of said outer tubular fitting; said coupling member having an outer one end portion with a plurality of flat surfaces to facilitate the turning of said coupling; and said other end portion of said outer tubular fitting having a groove adjacent the end thereof, a snap ring mounted in said last mentioned groove of said other end portion of said outer tubular fitting to retain said rotary coupling member thereon; and said coupling member having an outer other threaded end portion for connection to a fuel dispensing coupling.

2. A fuel hose assembly as set forth in claim 1 wherein said inner hose has a spiral wire wound thereabout for the full length thereof and being connected to said inner tubular fitting for grounding of said inner hose.

3. A fuel hose assembly as set forth in claim 2 wherein the respective inner peripheral end portions of said rotary coupling member have bearing means located therein to facilitate the rotation of said coupling member on said outer tubular fitting.

4. A liquid fuel dispensing and vapor recovery system comprising storage means for said liquid, a fuel discharge conduit connected to said storage means, a vapor recovery conduit connected to said storage means, a hose assembly operatively connected to said conduits for dispensing liquid fuel from said storage means to a vehicle tank, a nozzle means mounted on one end of said hose assembly for directing liquid from said hose assembly outwardly therefrom to such vehicle tank, an adapter connected to the other end of said hose assembly interconnecting said hose assembly with said fuel discharge conduit and said vapor recovery conduit, said adapter having a central chamber, said adapter having a pair of spaced openings communicating with said chamber, said adapter having a third opening opposite one of said pair of openings, said third opening connected to said fuel discharge conduit, said one opening of said pair of openings connected to said hose assembly the other one of said pair of openings connected to said vapor recovery conduit, said nozzle means having an encompassing flexible boot for passing vapors from such vehicle tank through said nozzle means to said hose assembly, said hose assembly having a pair of flexible concentric hoses extending the full length thereof, one of said hoses being of lesser diameter than the other one of said hoses defining an inner passage and an outer annular passage, said outer passage interconnecting said boot with said vapor recovery conduit through said other of said pair of openings for conveying vapors, energizable pumping means operatively connected to said storage means for pumping liquid fuel to said fuel discharge conduit and said inner passage of said hose assembly through said third opening, said inner passage connected to said nozzle means for delivering the liquid fuel to such vehicle tank, liquid sensing means mounted on said adapter and extending into said chamber for detecting liquid fuel, and said liquid sensing means operative upon detection of liquid fuel to de-energize said pumping means.

5. A liquid fuel dispensing and vapor recovery system as set forth in claim 4 wherein said concentric hoses are rotatably mounted relative to each other on said adapter to provide relative rotation between said concentric hoses.

6. A liquid dispensing and vapor recovery system as set forth in claim 5 wherein said nozzle means is rotatably mounted on said hose assembly to provide relative rotation therebetween.

7. A liquid dispensing and vapor recovery system comprising storage means for liquid fuel, a hose assembly connected to said storage means for dispensing liquid fuel therefrom to a vehicle receptacle and returning vapor from said vehicle receptacle thereto, a nozzle means rotatably mounted on one end of said hose assembly for relative rotation thereo, said nozzle means having a dispensing nozzle, a boot encompassing said dispensing nozzle for collecting vapors therefrom, an adapter means connected to the other end of said hose assembly for interconnecting said hose assembly to said storage means, said adapter means having a pair of laterally spaced openings, one of said openings interconnecting a supply pipe connected to said adapter by a third opening to said hose assembly, said supply pipe connected to said storage means, to provide access to said liquid fuel therein, the other of said laterally spaced openings connected to a vapor recovery conduit for directing vapors lack to said storage means, said hose assembly having an inner and outer hose which are cooperative to define a pair of concentric hoses, a spider interconnecting the respective ends of said inner hose and said outer hose to provide relative rotation therebetween, said adapter having a pair of aligned tubular hubs (30 and 29) defining a pair of concentric openings, said adapter third opening connected to said supply pipe being formed by one of said concentric openings, said inner hose of said pair of concentric hoses being connected to the other frictionally engaged by one of said pair of concentric openings to provide a freely rotative connection therebetween, said outer hose cooperative with said inner hose to define an annular passageway, swivel means interconnecting said outer hose to said one opening of said adapter to provide relative rotation between said outer hose and said adapter, said inner hose connecting said supply pipe through said adapter to said dispensing nozzle for dispensing liquid fuel, said annular passageway connecting said vapor recovery conduit through said adapter to the clearance space between said boot and said dispensing nozzle for directing vapors therefrom, and liquid sensing means mounted in said adapter and positioned adjacent to said other opening of said adapter connected to said vapor recovery conduit and responsive to liquid passing thereby to provide an output operative to interrupt the flow of liquid fuel from said supply pipe.

8. A liquid dispensing and vapor recovery system as set forth in claim 18 wherein a coupling connects the respective ends of said hose assembly to said nozzle means and said adapter, each of said couplings having a first tubular member and a second tubular member, a spider means interconnecting said tubular members for free rotative movement therebetween, said spider means operative to prevent axial linear movement between said tubular members, and a swivel nut interconnecting said adapter to an adjacent one of said outer tubular members for rotation between said last mentioned outer tubular member and said adapter.

9. A liquid dispensing and vapor recovery system as set forth in claim 8 wherein said coupling to said nozzle means has three tubular connections, one of said tubular connections having a tubular hub therein, said tubular hub having an external diameter that is less than the internal diameter of said one tubular connection, said tubular hub being connected to said inner hose, the clearance space between said tubular hub and said one tubular connection being connected to said annular passageway.

10. A liquid dispensing and vapor recovery system as set forth in claim 9 wherein said remaining ones of said tubular connections are connected to separate channels in said nozzle means to provide one direct connection between said dispensing nozzle and said inner hose to dispense gasoline and a second direct connection between said annular passageway, said vapor recovery conduit and said clearance space surrounding said nozzle by said boot.

11. A liquid dispensing and vapor recovery system as set forth in claim 10 wherein said inner hose has a wire coiled along the full length thereof and contacting said second tubular member of said couplings at the respective end portions of said hose assembly.

12. A liquid dispensing and vapor recovery system as set forth in claim 11 wherein a coil spring in said adapter and in one of said hubs abuttingly engages the respective end portions of said second tubular members to provide a grounding of said inner hose.

* * * * *